United States Patent

[11] 3,615,407

[72] Inventors Harvey A. Hodes;
 Michael C. Zerner, both of Eatontown, N.J.
[21] Appl. No. 777,918
[22] Filed Nov. 21, 1968
[45] Patented Oct. 26, 1971
[73] Assignee The United States of America as represented by the Secretary of the Army

[54] METHOD OF TREATING A SINTERED PHOTOCONDUCTOR
 4 Claims, No Drawings
[52] U.S. Cl........................................................ 96/1.5,
 252/501, 117/201
[51] Int. Cl........................................................ G03g 5/00,
 H01c 13/00
[50] Field of Search............................................ 96/1.5, 1.8;
 252/501

[56] References Cited
 UNITED STATES PATENTS

| | | | |
|---|---|---|---|
| 2,908,594 | 10/1959 | Briggs............................ | 117/201 |
| 2,957,152 | 10/1960 | Van Gool et al.............. | 338/15 |
| 3,345,161 | 10/1967 | Mammino et al............. | 96/1.7 |
| 3,453,141 | 7/1969 | Anolick et al. ............... | 117/201 |

*Primary Examiner*—George F. Lesmes
*Assistant Examiner*—M. B. Wittenberg
*Attorneys*—Harry M. Saragovitz, Edward J. Kelly, Herbert Berl and Roy E. Gordon ABSTRACT: A sintered photoconductor having increased photoconductivity is obtained by saturating a sintered photoconductor with a liquid dielectric.

METHOD OF TREATING A SINTERED PHOTOCONDUCTOR

The invention described herein may be manufactured, used, and licensed by or for the Government for governmental purposes without the payment to us of any royalties thereon.

BACKGROUND OF THE INVENTION

This invention relates in general to the art of photoconductivity, and in particular to the manufacture of improved sintered photoconductors used in electrophotography and photoelectrolytic imaging systems.

It has been known that photoconductive layers can be made from photoconductive materials by various techniques as for example, spray deposition, electrolytic deposition, sintering, sputtering and vacuum deposition, and dispersions of photoconductive materials in various binders.

A sintered photoconductor for example, can be conveniently prepared by thoroughly mixing photoconductive materials as for example, cadmium sulfide and cadmium chloride with a suitable binder as, for example, glycerine and placing this mixture on a suitable electrically conductive support. The coated support is then places in an oven and the temperature gradually raised to about 500° to 525° C. while maintaining an atmosphere of nitrogen inside the oven. After 20 minutes, the coated support is allowed to cool to room temperature still under nitrogen. This procedure is an accepted method for the manufacture of a sintered photoconductor.

For purposes of definition, the sintered photoconductor as prepared above, and in fact, sintered photoconductors generally, are characterized by a porous structure, where the size of the pores and the degree of porosity are governed by the method of manufacture. Common examples of such porous structures are ordinary brick or unglazed ceramic ware.

One difficulty encountered with the untreated sintered photoconductors known in the art is their poor photoconductive response at low light levels. Another difficulty is their lack of water resistivity and inadequate electrical stability. The destructive effects of moisture, even atmospheric moisture on photoconductive materials such as cadmium sulfide, cadmium sulfoselenide, zinc sulfide, cadmium selenide, etc., are well known. Since the sintering process increases the available surface area, the harmful effects of moisture are accentuated in this type of photoconductor. In fact, untreated sintered photoconductors generally lose their photoconductive ability in a few weeks, and eventually crumble apart.

SUMMARY OF THE INVENTION

The general object of this invention is to provide a method of treating a sintered photoconductor so that the resulting photoconductor will have improved photoconductive properties especially at low light levels. Particular further objects of the invention are to improve the water resistivity and electrical stability of sintered photoconductors, and also increase the effective lifetime thereof.

It has now been found that the aforementioned objectives can be attained by treating the sintered photoconductor with a liquid dielectric. Upon diffusing through the porous structure of the sintered photoconductor, the dielectrics may remain as liquids, or they may contain polymerizable ingredients, or dissolved solids in suitable solvents. As an aid to easy absorption by the sintered material, these liquid dielectrics can be diluted with a solvent, which is removed by evaporation. Liquid dielectrics or insulators that may be used according to the invention include silicone oils, silicone resins, polystyrene resins, acrylic resins, mineral oils, epoxy resins, polyester resins, cellulose resins, and polyurethanes. It is to be understood that the aforementioned materials are merely exemplary of the classes of compounds that may be used. Those skilled in the art will recognize other dielectrics having similar properties to those mentioned.

The method of adding these insulating materials depends on the pore structure of the photoconductor and the viscosity of the insulating liquid. The entire photoconductor may be immersed in the liquid, or the insulating liquid may be poured onto the surface of the photoconductor, the solvent evaporated, and the process repeated until saturation. Another more elaborate procedure consists of evacuating the photoconductor inside a container. Attached to the top of the container, through a stopcock, is a reservoir of the dielectric. After evacuation is completed, the stopcock is opened and the liquid allowed to diffuse over the photoconductor surface. The aforementioned procedures are not exclusive, and are only illustrative of the variety of methods which may be employed to add the insulating medium.

It is believed that the treatment of the porous structure of the sintered photoconductor is effective due to the displacement of the dielectric medium, inherent in the sintered-type photoconductor, probably air, with another dielectric of markedly different dielectric or insulating characteristics.

DESCRIPTION OF THE PREFERRED EMBODIMENT

As the sintered photoconductor a sintered photoconductive layer of cadmium sulfide is used, this layer being contiguous with the electrically conductive side of a Nesa glass substrate. An epoxy resin diluted with diacetone alcohol is then poured over the sintered cadmium sulfide layer. The diluent, diacetone alcohol, is then allowed to evaporate off at room temperature. The sintered photoconductor that has been impregnated with the epoxy resin is then cured at 70° C. for several hours. The above-described treatment is repeated until a visible layer of epoxy remains after curing. This indicates that the sintered photoconductor has been saturated with epoxy resin. In this particular embodiment, it is found that two treatments are required to achieve saturation of the sintered cadmium sulfide layer which is about 8 mils in thickness. The visible layer of epoxy is then simply removed as for example, by lightly sanding its surface.

Photocurrent measurements are then made of an untreated sintered photoconductor and of a sintered photoconductor treated as above described, using a calibrated light source.

The following table illustrates the improvement attained in photoconductivity by treating the above-described photoconductor with the epoxy resin. It can be noted from the table that there is a marked difference in photocurrent below about three footcandles. The epoxy-treated sample produces about 30 times more photocurrent, at 0.03 footcandles, and more than 100 times more photocurrent, at 0.003 footcandles, than the untreated sample.

TABLE

Sintered Cadmium Sulfide Photoconductor 8 mils thick 22.5 volts applied

| Light Level Footcandles | Photocurrent in Amperes | |
| --- | --- | --- |
| | Untreated | Epoxy-Treated |
| 5,150 | $44 \times 10^{16}$ | $48 \times 10^{16}$ |
| 462 | $40 \times 10^{16}$ | $44 \times 10^{16}$ |
| 29.7 | $34 \times 10^{16}$ | $38 \times 10^{16}$ |
| 3.2 | $28 \times 10^{16}$ | $30 \times 10^{16}$ |
| 0.28 | $5.6 \times 10^{16}$ | $12.2 \times 10^{16}$ |
| 0.03 | $0.08 \times 10^{16}$ | $2.0 \times 10^{16}$ |
| 0.003 | $0.006 \times 10^{16}$ | $0.92 \times 10^{16}$ |

For reference, the relation of footcandle units to some common light sources is also given:
 0.1 footcandles is deep twilight
 0.01 footcandles is full moon
 0.0001 footcandles is starlight
 0.001 footcandles is quarter moon
 10 footcandles is a very dark day The treated sintered photoconductors as herein described are suitable for use as the photoconductive layer in photoelectrolytic imaging devices such as are disclosed and claimed in the pending U.S. Pat. applications of Hodes and Zerner for Photoelectric Imaging Device, Ser. No. 670,815 and Ser. No. 670,816 filed Sept. 26, 1967, now abandoned.

The method of treating sintered photoconductors as described herein is applicable regardless of the thickness of the layer of sintered photoconductor treated. In all cases, optimum results are obtained by saturation of the sintered photoconductor with liquid dielectric. The liquid dielectric used may also contain solutions or dispersions of doping or sensitizing agents which enhance the photoconductive properties and/or the spectral sensitivity of the sintered photoconductor.

The foregoing is to be considered merely as illustrative of the invention and not in limitation thereof.

What is claimed is:

1. A method of treating a sintered cadmium sulfide photoconductor so that said sintered photoconductor will have increased photoconductivity comprising saturating said sintered photoconductor with a liquid epoxy resin dielectric.

2. A method according to claim 1 wherein said sintered photoconductor is treated by immersion in the liquid dielectric.

3. A method according to claim 1 wherein said sintered photoconductor is treated by pouring the liquid dielectric onto the surface of the sintered photoconductor, evaporating off any solvent, and repeating the aforementioned steps until saturation results.

4. A method according to claim 1 wherein said sintered photoconductor is treated by subjecting the sintered photoconductor to vacuum evaporation and then allowing liquid dielectric to diffuse over the photoconductor surface.

* * * * *